(12) United States Patent
Heidan (10) Patent No.: US 9,931,917 B2
(45) Date of Patent: Apr. 3, 2018

(54) SLIDING ROOF SYSTEM FOR AN AUTOMOTIVE VEHICLE

(71) Applicant: Michael Heidan, Stuttgart (DE)

(72) Inventor: Michael Heidan, Stuttgart (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 15/239,051

(22) Filed: Aug. 17, 2016

(65) Prior Publication Data

US 2017/0050501 A1 Feb. 23, 2017

(30) Foreign Application Priority Data

Aug. 21, 2015 (DE) .................. 10 2015 010 797
Feb. 2, 2016 (DE) .................. 10 2016 201 576

(51) Int. Cl.
*B60J 7/05* (2006.01)
*B60J 7/02* (2006.01)
*B60J 7/053* (2006.01)

(52) U.S. Cl.
CPC ............... *B60J 7/024* (2013.01); *B60J 7/053* (2013.01)

(58) Field of Classification Search
CPC .................................. B60J 7/024; B60J 7/053
USPC ................................ 296/221, 223, 224, 213
See application file for complete search history.

(56) References Cited

U.S. PATENT DOCUMENTS

| | | | |
|---|---|---|---|
| 7,644,980 B2 * | 1/2010 | Hager | B60J 7/02 296/221 |
| 7,950,733 B2 | 5/2011 | Faerber | |
| 8,720,987 B2 | 5/2014 | Ohdoi et al. | |
| 2011/0012391 A1 | 1/2011 | Faerber | |
| 2014/0042778 A1 | 2/2014 | Ohdoi et al. | |

FOREIGN PATENT DOCUMENTS

DE  10 2012 008 826 A1  10/2013
EP       2 650 156 A1    10/2013

OTHER PUBLICATIONS

European Patent Office Search Report issued in Application No. 16 18 3845 with English language translation of documents dated Feb. 14, 2017 (10 pages).

* cited by examiner

*Primary Examiner* — Dennis H Pedder

(74) *Attorney, Agent, or Firm* — Flynn, Thiel, Boutell & Tanis, P.C.

(57) ABSTRACT

Sliding roof system for an automotive vehicle with a movable roof part, a fixed in location roof portion and an adjustment mechanism positioned within a guide track arrangement in order to displace the roof part between a closed position, a ventilation position and an open position below the roof portion. The adjustment mechanism includes a drive carriage driven by a drive system and a support profile fixedly connected to the roof part and operatively connected to the drive carriage by a slotted guide mechanism. The support profile, on the rear end region thereof, is articulated to a support lever, which lever is longitudinally displaceable within the guide track arrangement by a support carriage. Within the guide track arrangement a support recess is provided and fixed in location, in which a support element of the support lever is supported in response to a position of the support lever.

10 Claims, 14 Drawing Sheets

SLIDING ROOF SYSTEM FOR AN AUTOMOTIVE VEHICLE

CROSS-REFERENCE TO RELATED APPLICATIONS

This claims priority from German Patent Application No. 102015010797.6, filed Aug. 21, 2015 and German Patent Application No. 102016201576.1, filed Feb. 2, 2016, the disclosures of which are hereby incorporated by reference in their entireties into this application.

FIELD OF THE INVENTION

The invention relates to a sliding roof system for an automotive vehicle, with a movable roof part and a fixed in location roof portion and with at least one adjustment mechanism which is positioned within a guide track arrangement in order to displace the roof part between a closed position, a ventilation position and an open position moved below the fixed in location roof portion, the adjustment mechanism including a drive carriage capable of being driven by a drive system, and a support profile fixedly connected to the roof part and operatively connected to the drive carriage by means of a slotted guide mechanism.

BACKGROUND OF THE INVENTION

Such a sliding roof system is disclosed in EP 2 234 831 B1. The known sliding roof system includes a movable roof part which is displaceable by means of a corresponding adjustment mechanism on each of opposite longitudinal sides between a closed position, an obliquely upwards deployed ventilation position and an open position moved rearwards below a fixed in location roof portion. The two adjustment mechanisms on the opposite longitudinal sides are drivable by a drive system in a manner synchronized with each other and have a functionally identical design. The adjustment mechanism includes a support profile fixed on a corresponding longitudinal side of the movable roof part and having a slotted guide mechanism operatively connected to a drive carriage. The drive carriage is displaceable within a guide track arrangement. Displacing the drive carriage within the guide track arrangement causes corresponding pivoting, lowering and lengthwise displacement moves of the support profile, whereby the movable roof part is entrained accordingly. The support profile is mounted in the vicinity of the front end region thereof within the guide track arrangement using a slip joint so as to allow pivoting and shifting moves.

SUMMARY OF THE INVENTION

It is the object of the invention to provide a sliding roof system of the type mentioned at the beginning which offers high stability and reliability of the movable roof part in the various functional positions using simple means.

This object is achieved in that the support profile, on the rear end region thereof, is articulated to a support lever, which lever is longitudinally displaceable within the guide track arrangement by means of a support carriage, and in that within the guide track arrangement a support recess is provided and fixed in location, wherein a support element of the support lever is supported in response to a position of the support lever. According to the invention, the support profile is, on its front end region, mounted by means of a slip joint within the guide track arrangement, in analogy to the state of the art as described, and additionally also supported on the rear end region thereof relative to the guide track arrangement. The support element of the support lever is fixedly connected to the support lever and provides for an additional support of the rear end region of the support profile and, thus, also of a rear portion of the movable roof part. The expressions "front" and "rear" are related to the ordinary headway of a vehicle, in which the sliding roof system is employed. Preferably, the sliding roof system according to the invention is provided in a roof zone of a passenger vehicle.

In an embodiment of the invention, the support element attached on the support lever has a circular-arc-shaped curvature, which curvature is oriented concentric to a pivot axis of the support lever on the support carriage transversely to the direction of displacement of the support carriage. As a result, the support element can plunge into the support recess by means of a pivot move of the support lever or be removed therefrom. The fixed in location support recess is preferably provided in a cover wall portion of the guide track arrangement. Advantageously, the support recess is also constituted by a complementary curved passage channel in an insert part which is retained in a corresponding section of the cover wall portion of the guide track arrangement.

In a further embodiment of the invention, the support lever has a seat for fixing a water drain extending in the transverse direction below a rear-side face edge of the movable roof part. The seat can be provided in the form of a corresponding profiling, a fixing bracket or the like. Advantageously, the water drain is connected to the support lever by means of mechanical attachment means, like in particular screwed fastening.

In a further embodiment of the invention, the support element and the support recess are matched to each other within the guide track arrangement such that, during lowering of the support lever, the support element can plunge downward through the support recess in order to release the support lever for longitudinal displacement along the guide track arrangement. Therefore, the support recess is open both towards the top and towards the bottom. Preferably, corresponding channel walls of the support recess are designed such that the support element is supported within the support recess in a non-rattling manner and can plunge through the support recess upwards or downwards without rattling.

In a further embodiment of the invention, the slotted guide mechanism includes a sliding link of L-shape or T-shape in cross section in the vicinity of a bottom side of the support profile, and the drive carriage includes a sliding block engaging the sliding link in a C-shape in cross section. Preferably, sliding portions of the sliding block accordingly contacting the sliding link are provided with a sliding layer in order to allow low-noise and low-wear sliding of the sliding block along the sliding link.

In a further embodiment of the invention, the slotted guide mechanism includes a release portion for the sliding block and a catch hook for entraining the support profile with the drive carriage. The release portion is matched to the dimensions of the sliding block in order to allow free movement of the sliding block relative to the support profile in the release portion. On the rear side, the release portion adjoins the T-shaped sliding link section. Axially offset to the rear in relation to the release portion the catch hook of the slotted guide mechanism is provided. The drive carriage has a transversely extending profile bar section which cooperates with the catch hook of the slotted guide mechanism of the support profile. Preferably, the profile bar section is a crossway bolt extending between two wall sides of the drive carriage.

In a further embodiment of the invention, the support lever includes at least one guide bracket for sliding guidance of the support lever above or below a wall portion of the guide track arrangement, and the guide track arrangement includes at least one passage in said wall portion in order to allow upward or downward plunging through of the guide bracket. The at least one guide bracket is for supporting and sliding guidance of the support lever on the guide track arrangement during shifting of the support profile together with the movable roof part into the open position below the fixed in location roof portion along the guide track arrangement.

BRIEF DESCRIPTION OF THE DRAWINGS

Further advantages and features of the invention will become apparent from the claims and from the description below of a preferred exemplary embodiment of the invention illustrated with reference to the drawings.

FIG. 7b shows a schematic view of a cross section of a further drive carriage similar to FIG. 7a;

DETAILED DESCRIPTION

Figure 1:
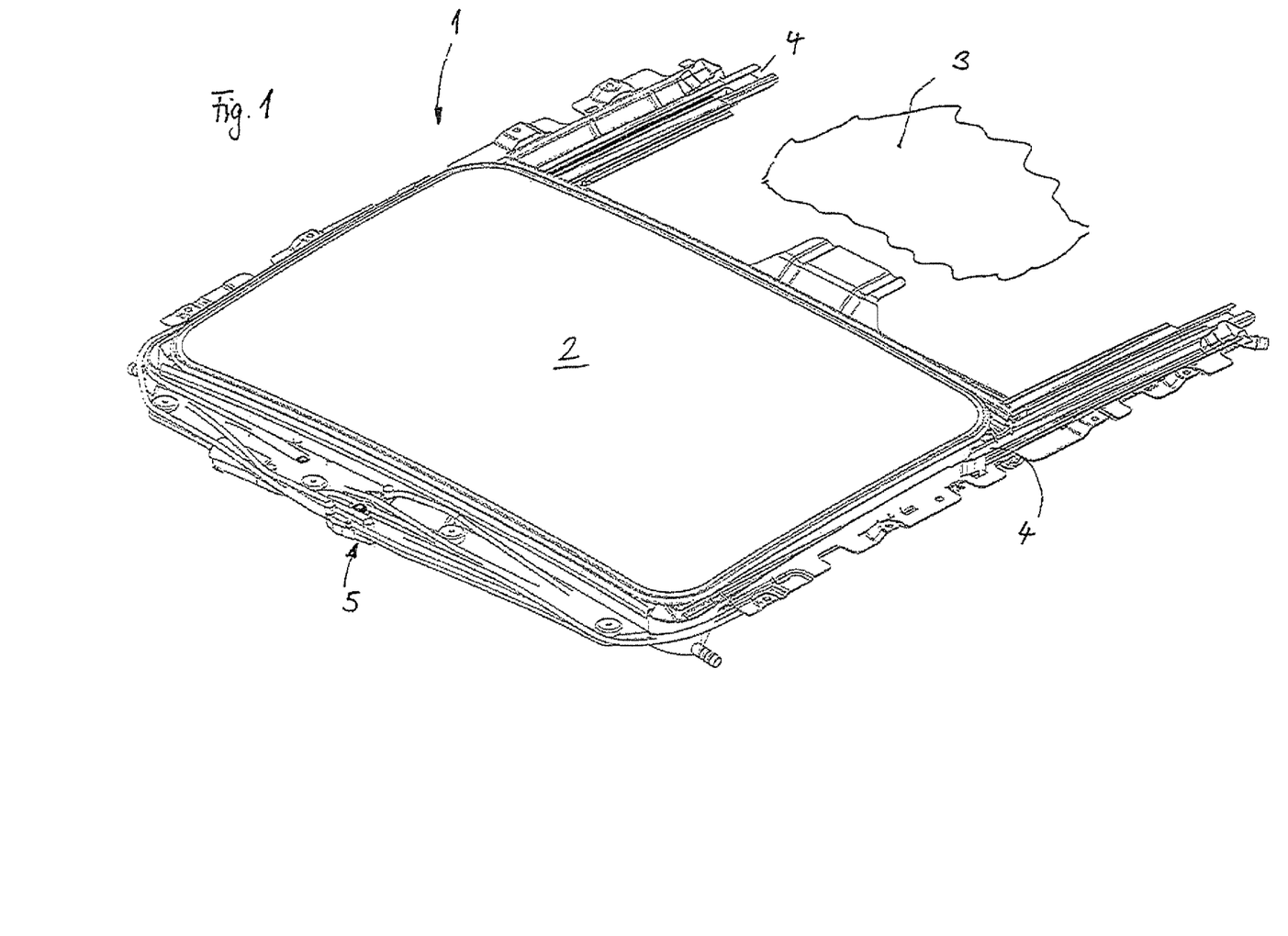
FIG. 1 shows a perspective view of an embodiment of a sliding roof system according to the invention in a closed position of a movable roof part.
Figure 2:
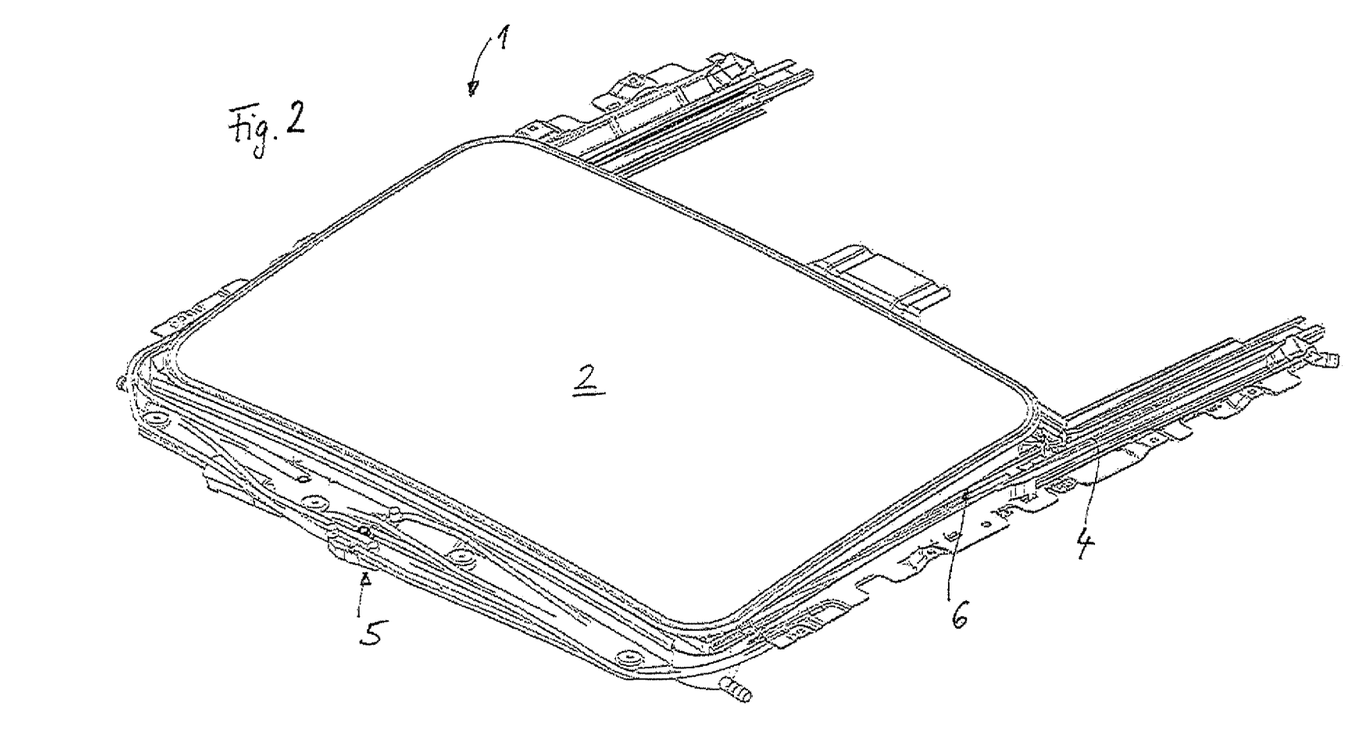
FIG. 2 shows the sliding roof system according to FIG. 1 in a ventilation position of the roof part.
Figure 3:
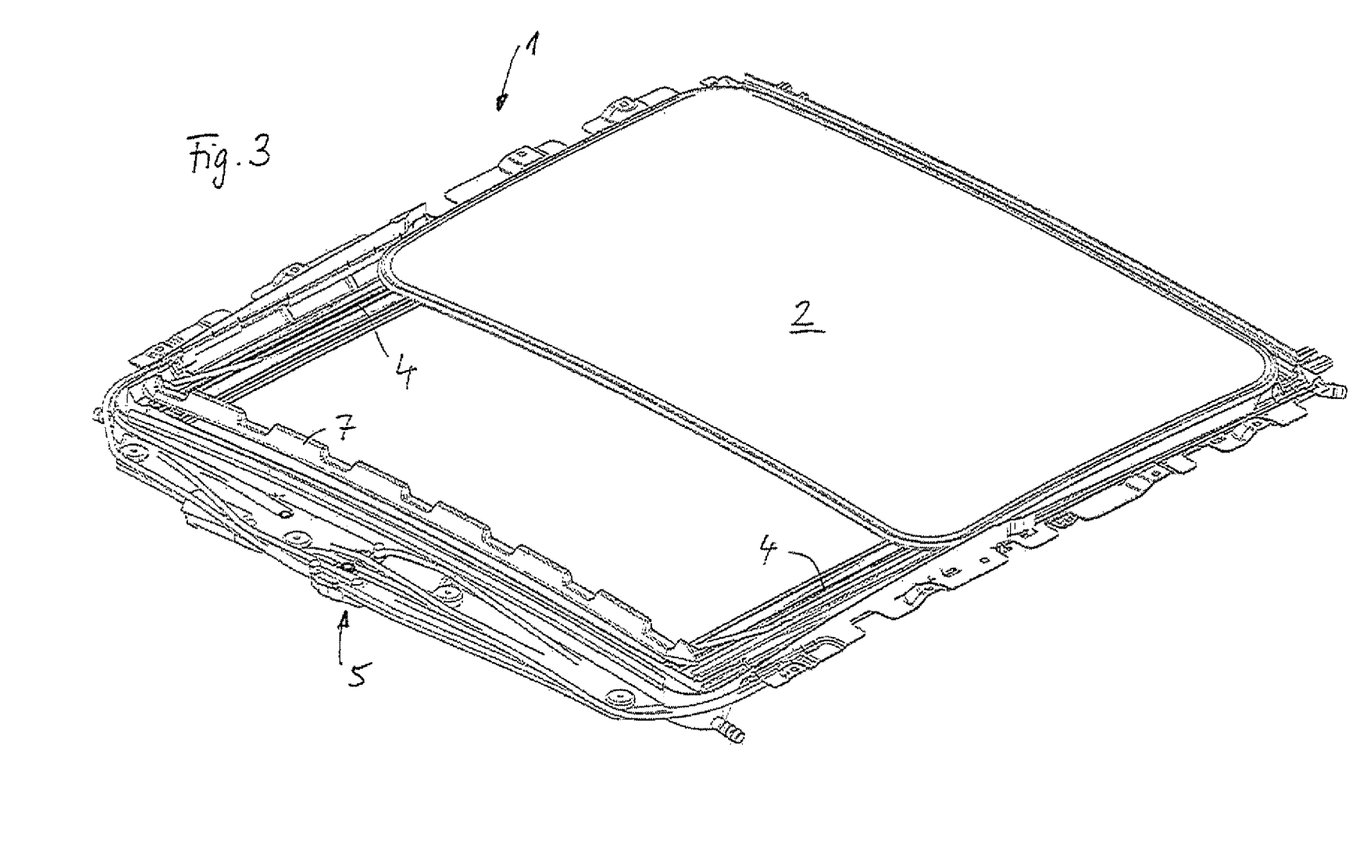
FIG. 3 shows the sliding roof system according to FIGS. 1 and 2 in an open position of the roof part.
Figure 4:
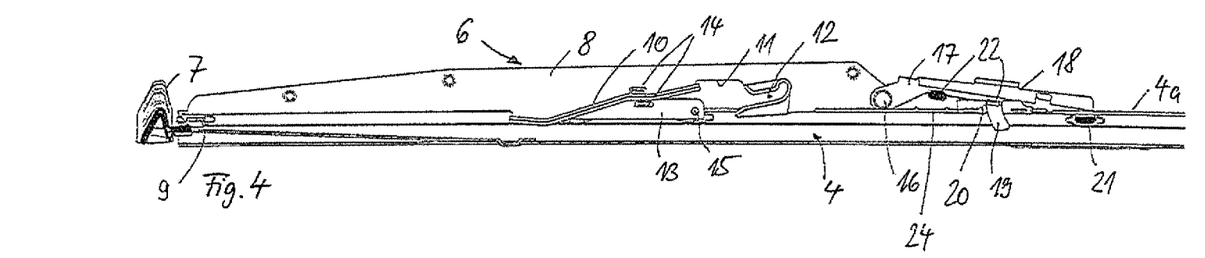
FIGS. 4 to 6 show a side view of an adjustment mechanism in the various functional positions of the roof part of the sliding roof system according to FIGS. 1 to 3.
Figure 5:
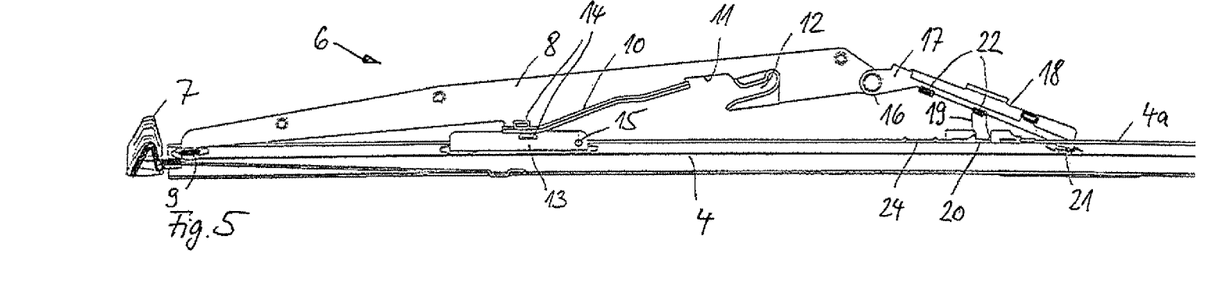

A passenger vehicle is provided with a sliding roof system 1 in the roof zone thereof, as illustrated with reference to FIGS. 1 to 3. The sliding roof system 1 includes a supporting frame, not indicated in more detail, which is connected to corresponding supporting structure sections in the roof zone of the passenger vehicle. The sliding roof system 1 is supplied and fixed to the roof zone in an at least largely pre-assembled condition.

The sliding roof system 1 includes a movable roof part 2 and a stationary roof portion 3 which is fixedly attached to the vehicle and, thus, in the installed condition fixed in location, which roof portion—as viewed in the ordinary direction of motion of the passenger vehicle—is disposed behind a roof opening of the sliding roof system 1, which roof opening is capable of being exposed or closed by the movable roof part 2. The fixed in location roof portion 3 is fixedly connected to the supporting frame of the sliding roof system 1. The movable roof part 2 is displaceable by means of a corresponding adjustment mechanism 6 (cf. FIGS. 4 to 16) on each of opposite longitudinal sides between a closed position (FIG. 1), a ventilation position (FIG. 2) and an open position (FIG. 3), wherein the movable roof part 2 is moved towards the rear and below the fixed in location roof portion 3. Each adjustment mechanism 6 is displaceable within a respective guide track arrangement 4 on opposite longitudinal sides of the supporting frame of the sliding roof system 1. The two guide track arrangements 4 on the opposite longitudinal sides are oriented in parallel to each other and mirror symmetrical relative to a vertical vehicle center longitudinal axis, but for the rest are designed identical to each other. Also the respective adjustment mechanism 6 within the respective guide track arrangement 4 is embodied functionally identical to the respective opposite adjustment mechanism 6. The adjustment mechanisms 6 also exhibit mirror symmetry in relation to a vertical vehicle center longitudinal axis. Furthermore, a drive system 5 is integrated in the supporting frame of the sliding roof system 1, and said drive system is disposed in front of the roof opening which is to be closed by the movable roof part 2. The drive system 5 includes an electric drive motor and two flexible drive transmission cables which are longitudinally displaceable via a synchronized gear mechanism of the drive motor in mutual synchronization. The two drive transmission cables are led to the opposite longitudinal sides of the supporting frame. One respective drive transmission cable is installed in the vicinity of a respective guide track arrangement 4 and connected to a drive carriage 13 of the corresponding adjustment mechanism 6 in order to displace the drive carriage 13 in the respective guide track arrangement 4 in the longitudinal direction forwards and backwards.

A wind deflector 7 is assigned to the roof opening in the vicinity of the front side thereof, and said deflector is capable of being displaced between a downwards lowered rest position and an upwards pivoted wind deflecting position in response to a position of the movable roof part 2. The wind deflector 7 is transferable into its wind deflecting position by spring force.

Below, the adjustment mechanism 6 located on the left hand side in the direction of motion of the passenger vehicle is illustrated with reference to FIGS. 4 to 16. The explanations in relation to the adjustment mechanism 6 according to FIGS. 4 to 16 apply similarly to the opposite adjustment mechanism.

The adjustment mechanism 6 includes a support profile 8 extending over a longitudinal side of the movable roof part and connected fixedly to the movable roof part 2 using screw connections or similar mechanical fastening means. As a result, displacing of the support profile 8 inevitably causes a corresponding displacement of the movable roof part 2.

The support profile 8 is provided with a slip joint 9 in a front end region, which joint is slidably mounted within the guide track arrangement 4. The slip joint 9 is also designed such that the support profile 8 is mounted to be pivotable about a pivot axis extending in the transverse direction of the sliding roof system 1, i.e., in the installed functional condition of the sliding roof system 1 in the roof zone of a passenger vehicle in the transverse direction of the vehicle. Furthermore, the support profile 8 is provided with a slotted guide mechanism 10 to 12 cooperating with the drive carriage 13 in a manner described in more detail below, which drive carriage is likewise mounted within the guide track arrangement 4 to be movable by means of the drive system 5. On a rear end region thereof, the support profile 8 is articulated to a support lever 17 via a connecting joint 16, which lever protrudes from the end region of the support profile 8 to the rear in the longitudinal direction of the guide track arrangement 4. The support lever 17, on the rear side end region thereof, is mounted within a channel of the guide track arrangement 4, which channel is located between upper and lower wall portions 4a and 4b thereof, using a slip joint 21 both for longitudinal displacement and limited pivot movement. The slip joint 21 is also referred to as support carriage according to the invention. For that purpose, the slip joint 21 is designed in analogy to the slip joint 9 of the support profile 8 and defines a pivot axis extending in the transverse direction. Additionally, the slip joint 21 has oppositely-facing convexly-shaped surfaces 21a and 21b. A seat 18 for fixing a water drain (not illustrated) is provided on the support lever 17, which drain extends below a rear-side end edge of the movable roof part 2 in the transverse direction, in order to prevent penetration of water from the region of the end edge of the movable roof part into the vehicle interior.

The support lever 17 is used to secure the support profile 8 in a limited range of movement against lengthwise shifting rearwards along the longitudinal direction of the guide track arrangement 4. For that purpose, a support element 19 is assigned to the support lever 17, which element is fixedly disposed on the support lever 17 and protrudes downwards in a circular-arc-shaped curvature. The support element 19 has a block-type design and has a circular-arc-shaped curvature extending concentric to the pivot axis of the slip joint 21. For supporting the support lever 17 in the longitudinal direction of the guide track arrangement 4, a support recess 20 is provided in an upper wall portion 4a of the guide track arrangement 4, which recess is integrated and fixed in location in the wall portion 4a of the guide track arrangement 4. The support recess 20 is provided in a component made of synthetic material, which component is attached in a corresponding sector of the upper wall portion 4a of the guide track arrangement 4. A free cross section of the support recess 20 is matched to the cross section of the support element 19 over the entire height in order to allow supporting of the support element 19 in the support recess 20 essentially free of clearance.

Figure 7A:
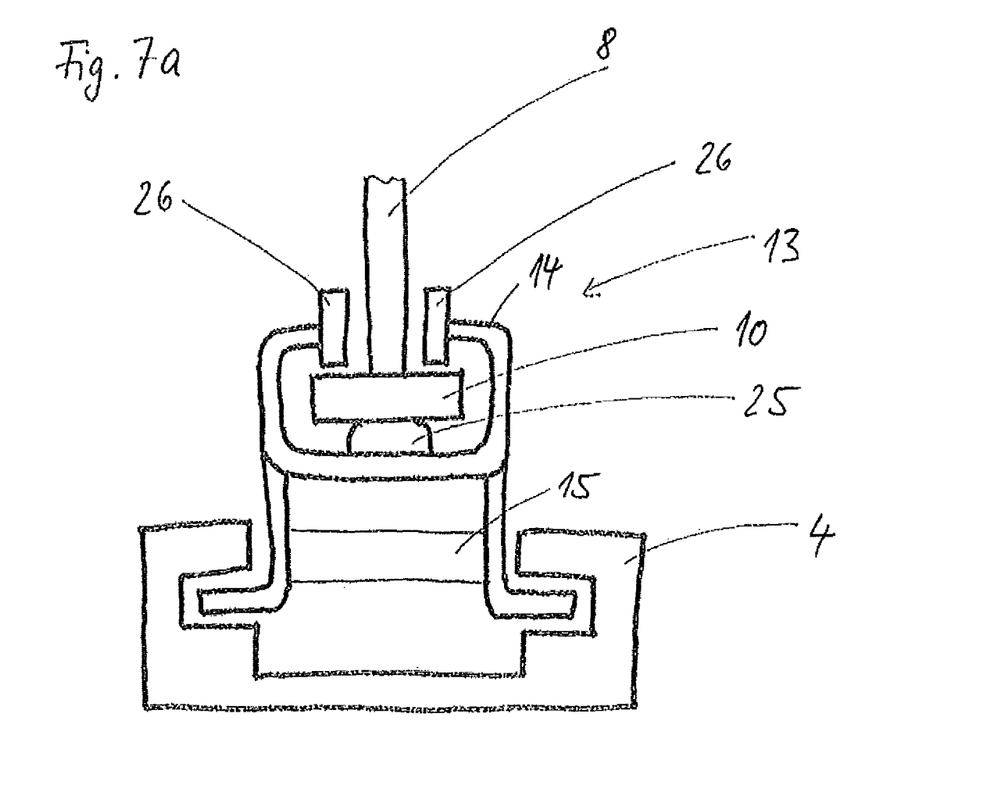
FIG. 7a shows an enlarged schematic illustration of a cross section through a drive carriage on the level of a sliding block of the adjustment mechanism according to FIGS. 4 to 6.

The slotted guide mechanism 10 to 12 of the support profile 8 has a sliding link 10 over a major part of the length thereof, which link defines a lower peripheral region of the support profile 8 and has an essentially T-shaped design in cross section (cf. FIG. 7a). In the longitudinal direction to the rear a release portion 11 adjoins the sliding link 10, which release portion is followed by a catch hook 12 in the longitudinal direction rearwards. The catch hook 12 is constituted by a connecting link slot, which is open to the front and curved upwards towards the rear end region thereof.

The thus produced slotted guide mechanism 10 to 12 cooperates with a sliding block 14 of the drive carriage 13.

Figure 6:
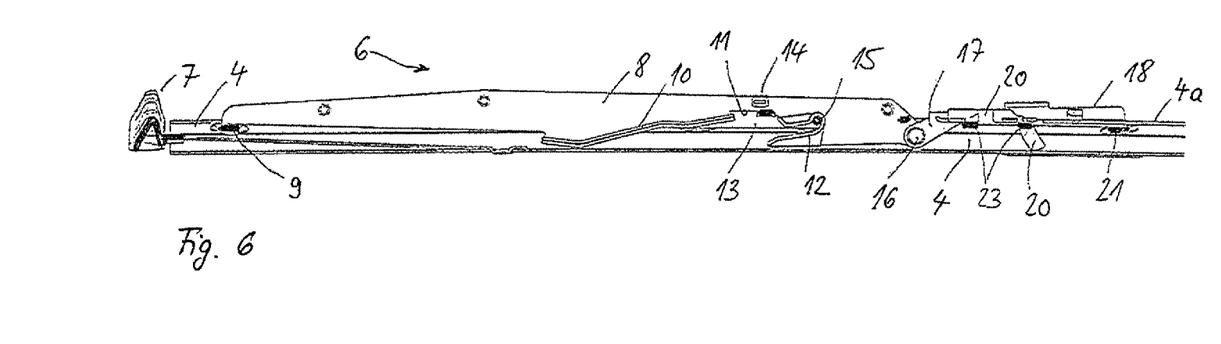

The sliding block 14 engages the T-shaped sliding link 10 of the slotted guide mechanism from the bottom side in a C-shape in cross section. The sliding block 14 has sliding elements 26 above the T-shaped sliding link 10 on corresponding free ends of C-legs of the sliding block 14, which elements are to prevent metallic contact between the support profile 8 made of metal and the sliding block 14 likewise made of metal. Moreover, a damping element 25 is assigned to the sliding block 14 below the sliding link 10, which damper is to prevent metallic abutment of a bottom side of the sliding link 10 and an interior side of the sliding block 14. Furthermore, the drive carriage 13 is provided with a crossway bolt 15 which cooperates with the catch hook 12 of the support profile 8 in order to allow entraining of the support profile 8 towards the rear along the longitudinal direction of the guide track arrangement. With reference to FIG. 6 it is apparent that the crossway bolt 15 plunges down to the end region of the catch hook 12 in order to lower the support profile 8 downwards and displace the support profile 8 to the open position of the roof part 2.

Figure 7B:
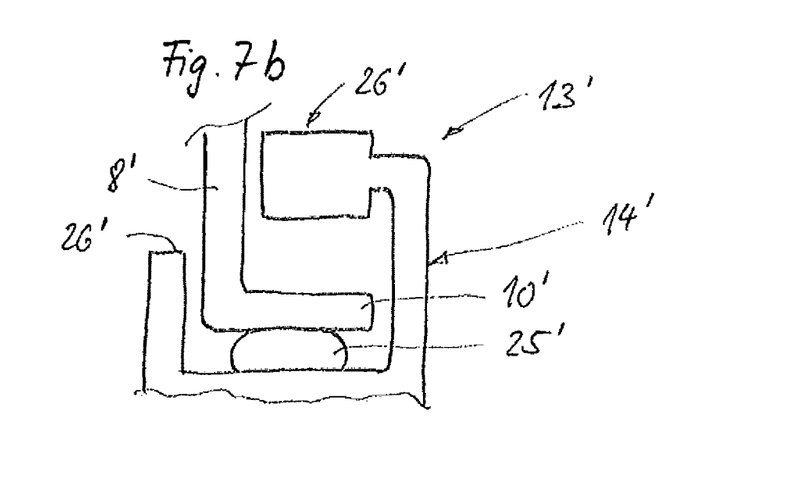
Figure 8:
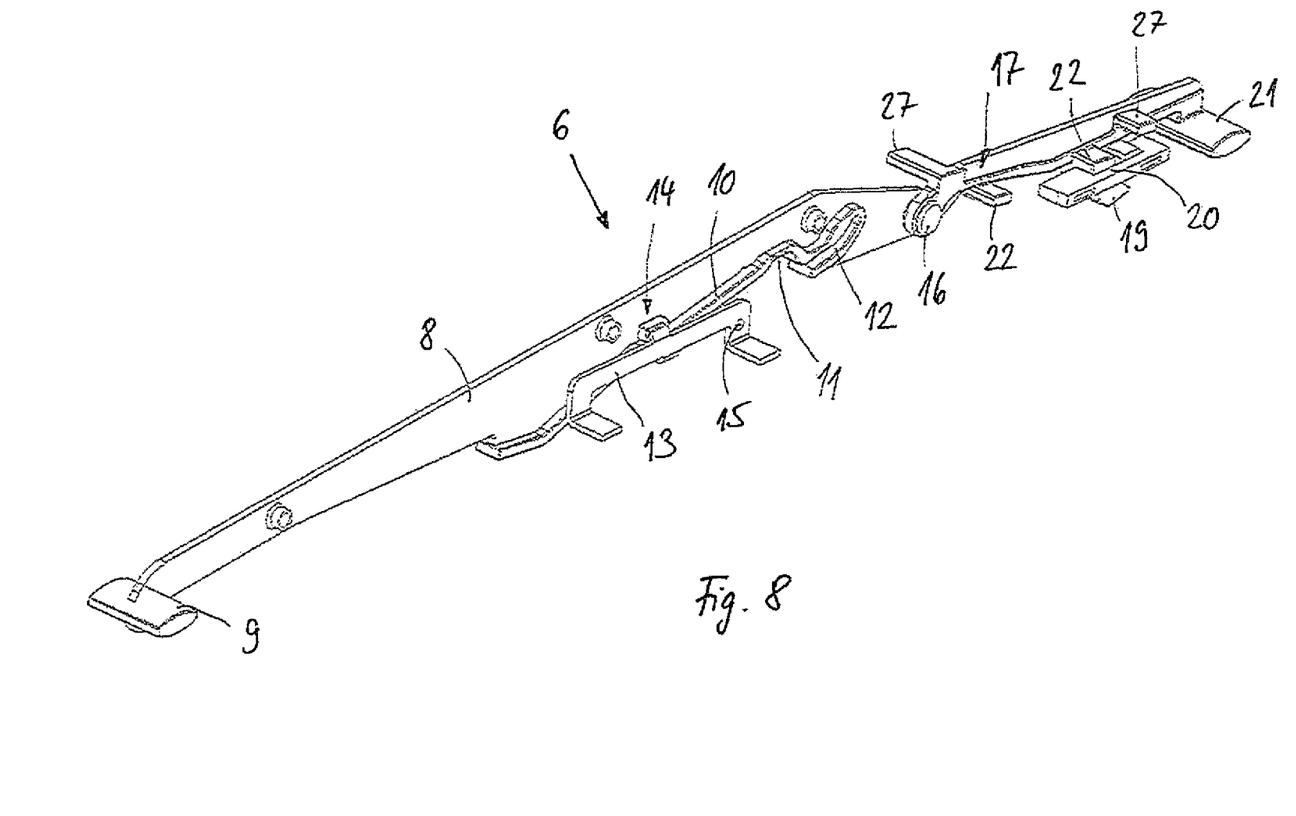
FIG. 8 shows a perspective view of the adjustment mechanism according to FIG. 4 in the closed position.
Figure 9:
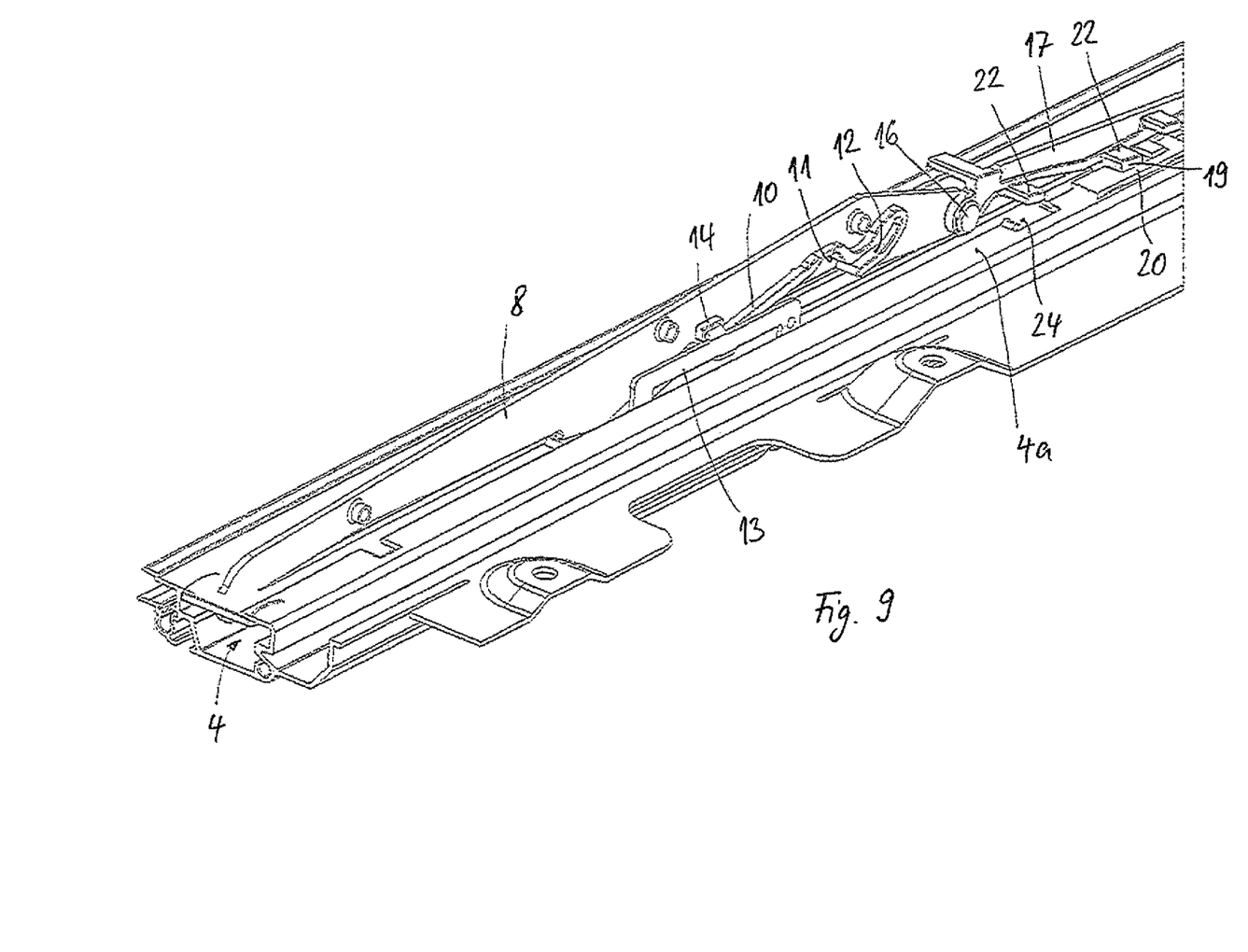
FIG. 9 shows the adjustment mechanism according to FIG. 8 within the guide track arrangement.
Figure 10:
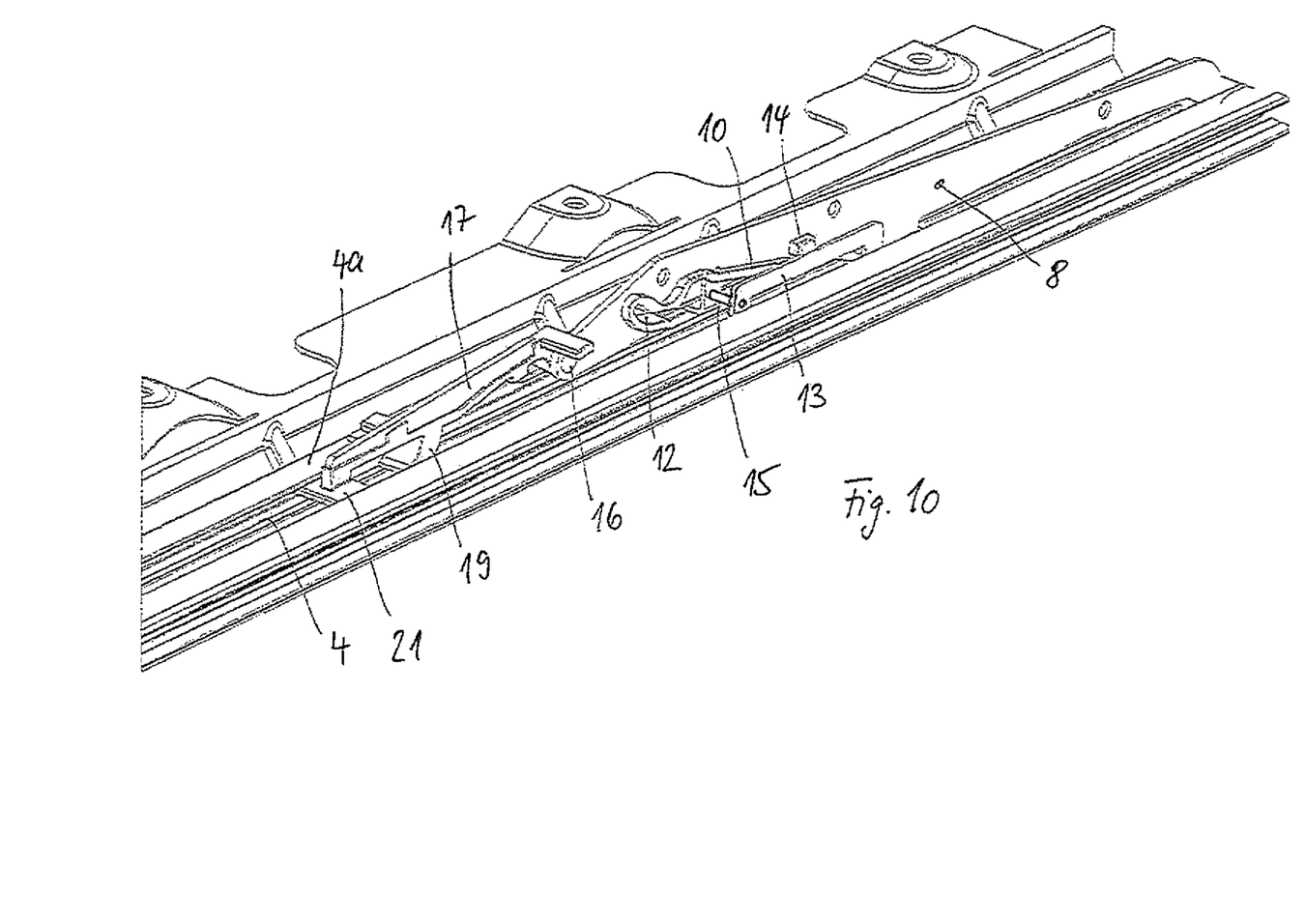
FIG. 10 shows another perspective view of the adjustment mechanism within the guide track arrangement according to FIG. 9.
Figure 11:
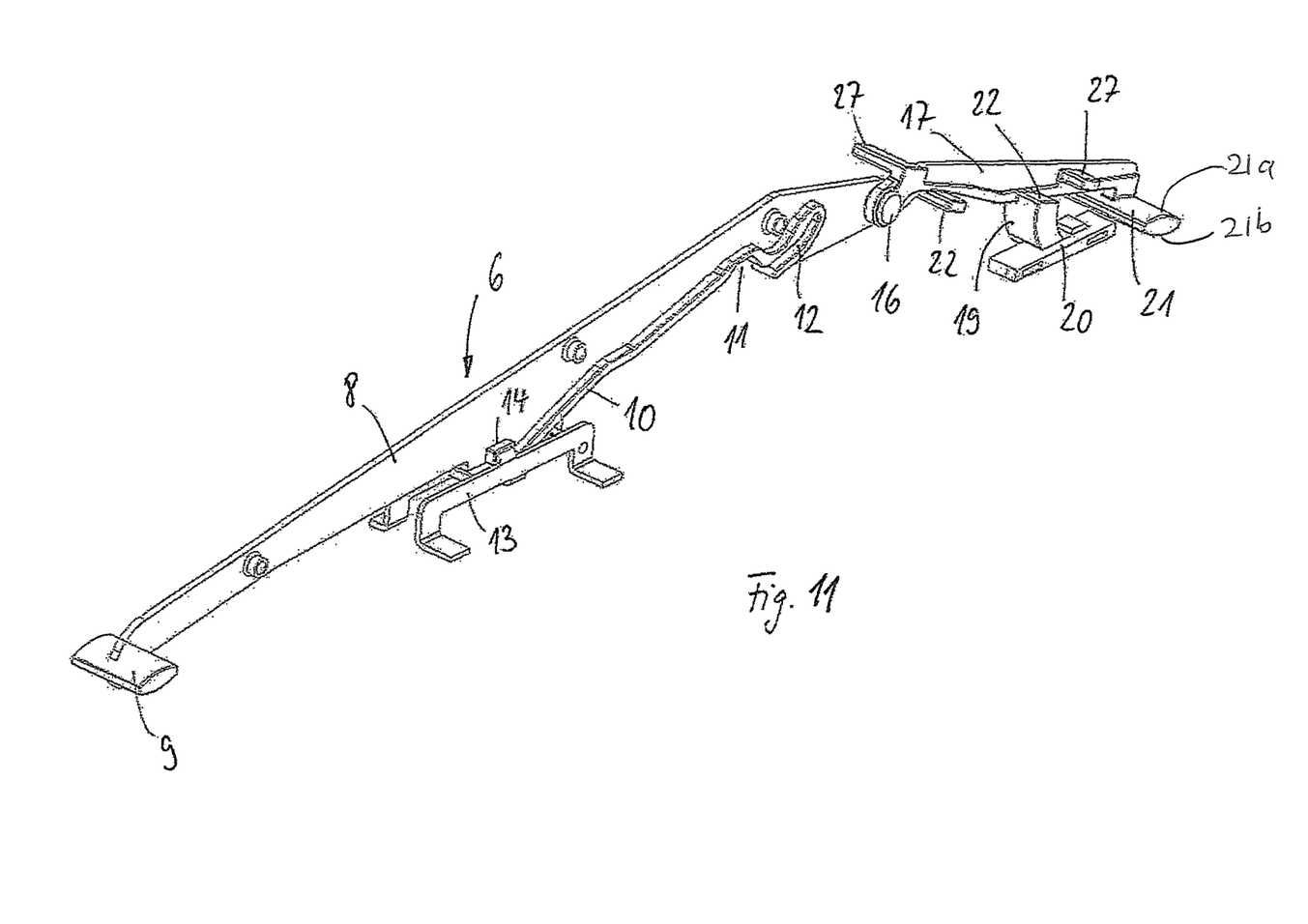
FIG. 11 shows the adjustment mechanism according to FIG. 8 in a ventilation position.
Figure 12:
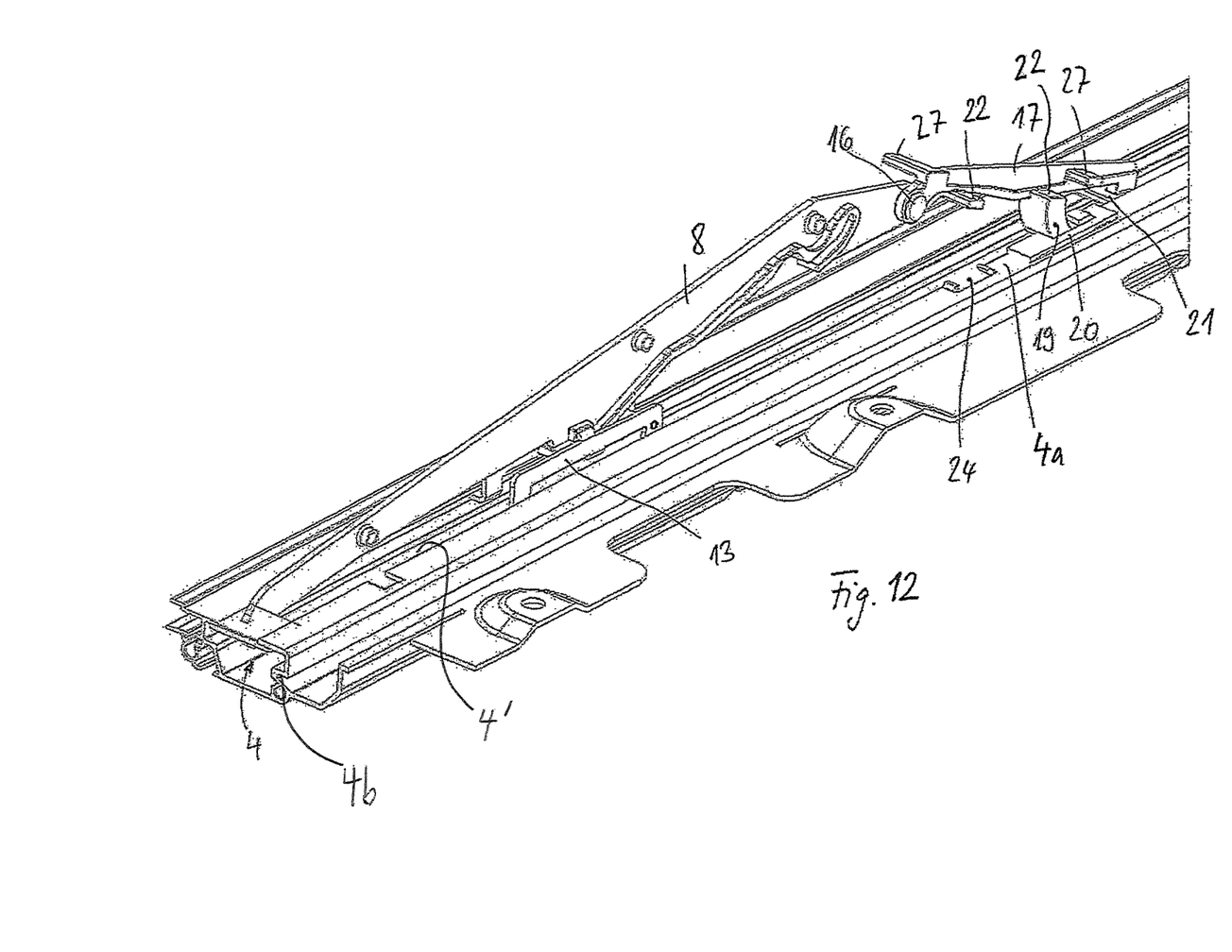
FIG. 12 shows the adjustment mechanism according to FIG. 11 within the guide track arrangement.
Figure 13:
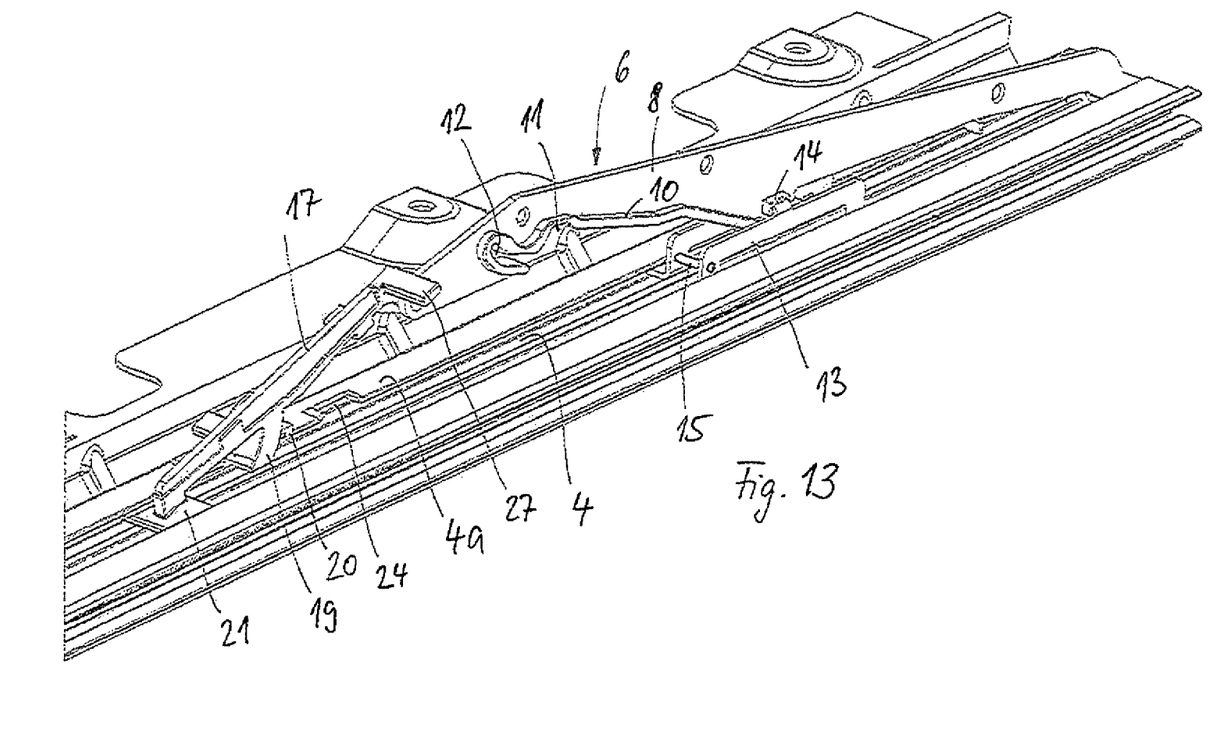
FIG. 13 shows another perspective view of the adjustment mechanism within the guide track arrangement according to FIG. 12.
Figure 14:
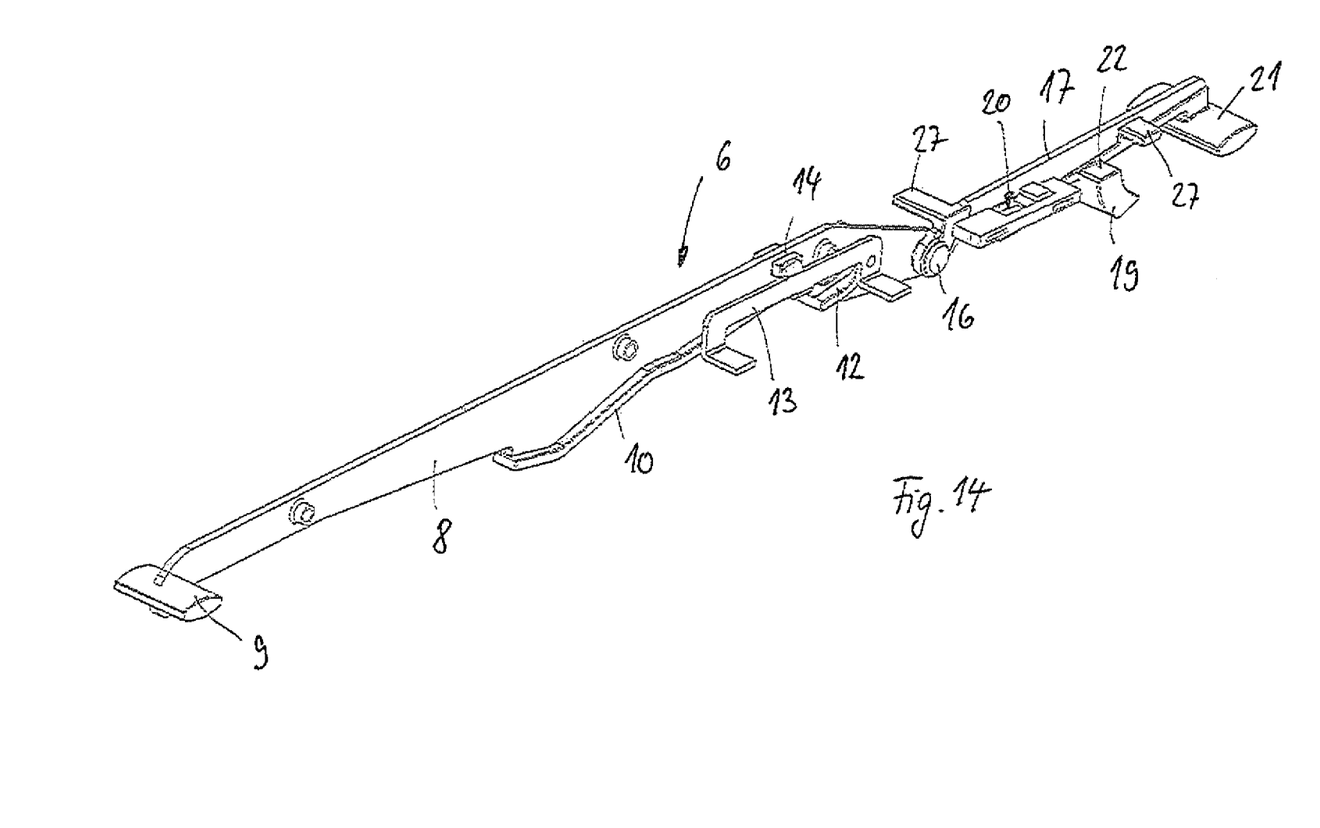
FIG. 14 shows the adjustment mechanism according to FIGS. 8 and 11 in an open position of the roof part.
Figure 15:
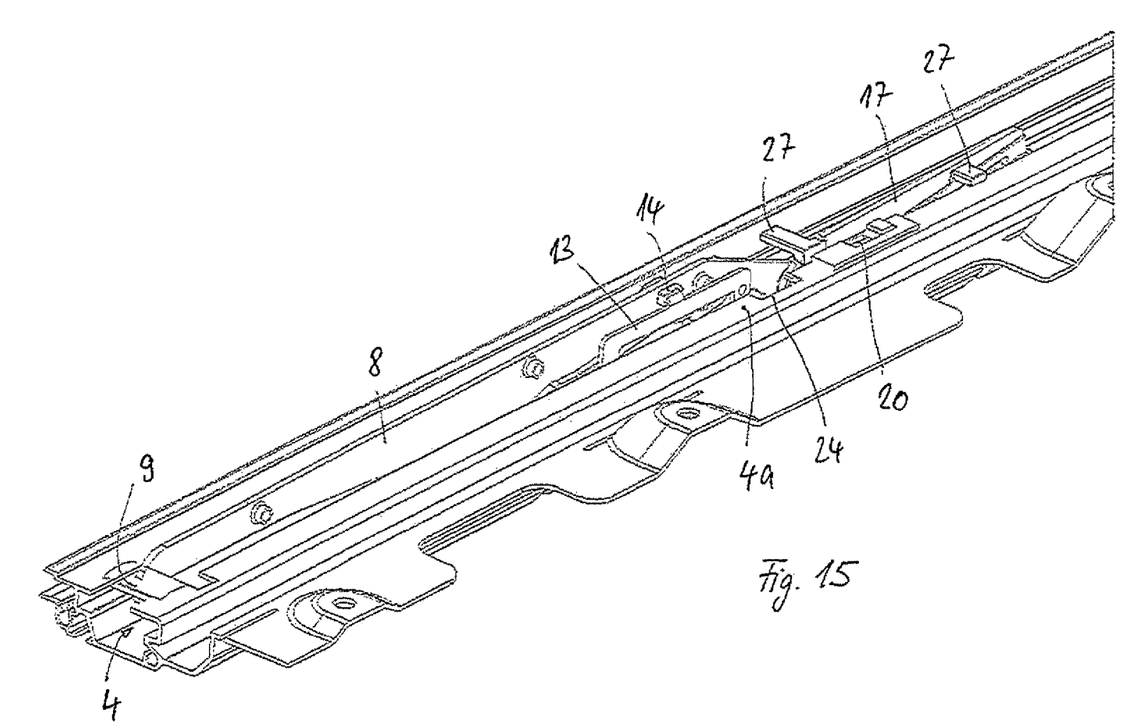
FIG. 15 shows the adjustment mechanism within the guide track arrangement in a position according to FIG. 14.
Figure 16:
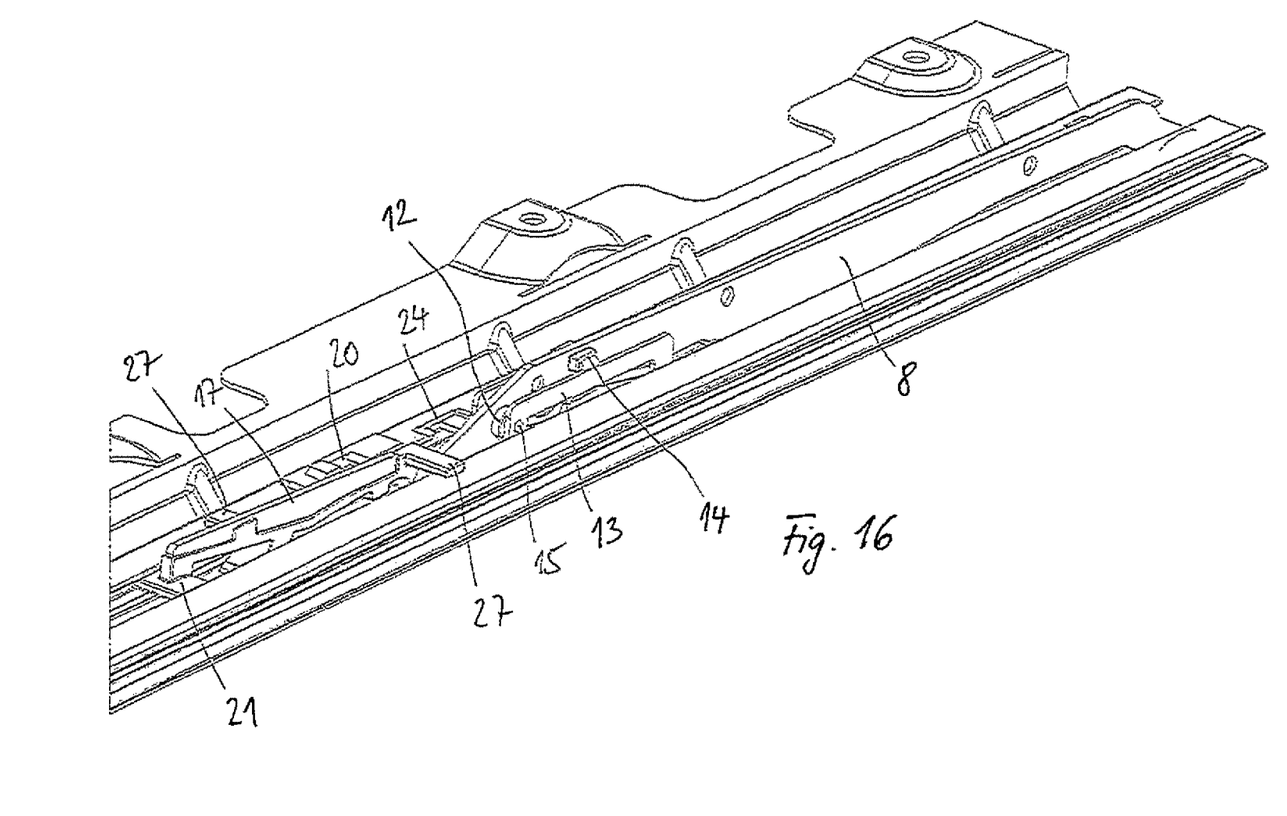
FIG. 16 shows another perspective view of the adjustment mechanism within the guide track arrangement in the open position of the roof part.

In the embodiment according to FIG. 7b, an L-shaped sliding link 10' is provided on the support profile 8' instead of a T-shaped sliding link. A sliding block 14' of the drive carriage 13' engages the sliding link 10' from below and from one side in a C-shape. Sliding elements 26' and a damping element 25' have the same function as the elements described above with reference to FIG. 7a.

The embodiment according to FIG. 7b includes the same reference numerals with an added apostrophe for parts and sections of identical design and similar function. To avoid repetitions in relation to parts of identical design and similar function reference is made to the description of the embodiment according to FIG. 7a.

Furthermore, a plurality of guide brackets 22, 27 protrude outwards or inwards from the support lever 17 transverse to a longitudinal extension of the support lever 17, which brackets are for guiding the support lever 17 relative to the guide track arrangement 4. One of the guide brackets 22 constitutes an upper end face of the support element 19. In order to allow plunging of the guide bracket 22, which is spaced to the front in relation to the support element 19, through the upper wall portion 4a of the guide track arrangement 4, the upper wall portion 4a includes a passage 24 at a distance in front of the support recess 20. Thus, the other one of the guide brackets 22 cooperates with the passage 24 in the upper wall portion 4a of the guide track arrangement 4. Both the guide brackets 22 are positioned on the support lever 17 in such a manner that, after lowering the support lever 17 downwards into the guide track arrangement 4 and longitudinal displacing of the adjustment mechanism rearwards, the two guide brackets 22 take support in the region of an interior side of the upper wall portion 4a of the guide track arrangement 4, and thus prevent that the support lever 17 can pivot upwards and out of the guide track arrangement again, since the guide track arrangement 4 forms a hollow profile which is open towards the top in the region of a longitudinal slot 4' and has an essentially C-shaped cross section. The guide bracket 27 protruding transversely inwards in opposition to the guide brackets 22, remains positioned above the upper wall portion 4a of the guide track arrangement 4, regardless of the position the support lever 17 will assume. The same applies to the further guide bracket 27 positioned on the level of the inwards protruding guide bracket 27 and protruding outwards in parallel to the guide brackets 22.

In order to transfer the support profile 8 from a closed position according to FIGS. 4 and 8 to 10 into a ventilation position according to FIGS. 5 and 11 to 13, the drive carriage 13 is moved forwards in a simple manner, whereby the sliding block 14 is necessarily shifted forwards along the sliding link 10. As a result, the support profile 8 is deployed towards the front. Simultaneously, the support lever 17 captured within the support recess 20 by the support element 19 is pivoted upwards as well. For transferring the support profile 8 from the ventilation position to the open position according to FIGS. 6 and 14 to 16, the drive carriage 13 is moved rearwards in the opposite direction, whereby the support profile 8 is necessarily lowered until the crossway bolt 15 of the drive carriage 13 is captured in the end region of the catch hook 12. Simultaneously, the support lever 17 is necessarily lowered downwards as well. Thereby, the support lever 17 is lowered downwards far enough that the upper end face of the support element 19, constituted by the guide bracket 22, is plunged completely through the support recess 20 downwards so that the guide bracket 22 is located within the corresponding groove channel of the guide track arrangement 4 and, thus, below the upper wall portion 4a. Now, the support lever 17 is no longer secured in the longitudinal direction so that by further movement of the drive carriage 13 to the rear the support profile 8 can be displaced rearwards together with the support lever 17 in the longitudinal direction of the guide track arrangement 4. Thereby, the support profile 8 is lowered downwards far enough that the movable roof part 2 can move rearwards below the stationary roof portion 3 until the open position of the movable roof part 2 according to FIG. 3 is reached.

In order to cause closing of the roof part 2 from the open position correspondingly in the reverse direction, the drive carriage 13 moves forwards again, whereby the crossway bolt 15 of the drive carriage 13 remains captured in the end region of the catch hook 12 for the time being until the support profile 8 has resumed its front end position where the slip joint 9 axially abuts on a corresponding end region of the guide track arrangement 4. The support profile 8 is now again located in the position where, during upwards pivoting of the support profile 8, the support element 19 can from below plunge upwards into the support recess 20 of the guide track arrangement 4, and accordingly be pivoted upwards and out of the support recess 20. Thereby, the support profile 8 can again be pivoted upwards towards the ventilation position until a new retracting move of the drive carriage 13 allows resuming of the closed position.

The invention claimed is:

1. A sliding roof system for an automotive vehicle, with a movable roof part and a fixed in location roof portion and with at least one adjustment mechanism positioned within a guide track arrangement in order to displace the roof part between a closed position, a ventilation position and an open position moved below the fixed in location roof portion, the adjustment mechanism including a drive carriage capable of being driven by a drive system, and a support profile fixedly connected to the roof part and operatively connected to the drive carriage by a slotted guide mechanism, wherein the support profile, on a rear end region thereof, is articulated to a support lever, the support lever is longitudinally displaceable within the guide track arrangement by a support carriage and includes a first guide bracket for sliding guidance of the support lever above a wall portion of the guide track arrangement, and a second guide bracket for sliding guidance of the support lever below the wall portion of the guide track arrangement, the guide track arrangement including a passage in the wall portion thereof in order to allow upwards or downwards plunging of the second guide bracket through the wall portion, the support carriage comprising a slip joint element non-movably fixed to the support lever and having a convex outer contour which permits limited pivoting movement of the slip joint element within and relative to the guide track arrangement, and within the guide track arrangement a support recess is provided and fixed in location, and a support element of the support lever is supported in response to a position of the support lever.

2. The sliding roof system according to claim 1, wherein the support element provided on the support lever has a circular-arc-shaped curvature, which curvature is oriented concentric to a pivot axis of the support lever on the slip joint element transversely to the direction of displacement of the slip joint element.

3. The sliding roof system according to claim 1, wherein the support lever has a seat for fixing a water drain extending in a transverse direction below a rear-side end edge of the movable roof part.

4. The sliding roof system according to claim 1, wherein the support element and the support recess are matched to each other within the guide track arrangement such that the support element during lowering of the support lever can plunge downwards through the support recess in order to release the support lever for longitudinal displacement along the guide track arrangement.

5. The sliding roof system according to claim 1, wherein the slotted guide mechanism includes a sliding link having an L or T-shaped cross section in the vicinity of a bottom side of the support profile, and the drive carriage includes a sliding block with a C-shaped cross section engaging the sliding link.

6. The sliding roof system according to claim 5, wherein the slotted guide mechanism includes a release portion for the sliding block and a catch hook for entraining the support profile with the drive carriage.

7. The sliding roof system according to claim 1, wherein the convex outer contour of the slip joint element cooperates with a wall of the guide rail arrangement to permit limited pivoting movement of the slip joint element and the support lever together with one another relative to the guide rail arrangement.

8. The sliding roof system according to claim 1, wherein the guide rail arrangement includes top and bottom vertically-spaced walls which together define part of a channel extending longitudinally along the guide rail arrangement, the slip joint element being disposed within the channel and confined vertically between the top and bottom walls of the guide rail arrangement, and the convex outer contour of the slip joint element has convexly-shaped top and bottom surfaces respectively disposed in facing relation with the top and bottom walls, the convexly-shaped top and bottom surfaces permitting limited pivoting movement of the slip joint element within and relative to the guide rail arrangement.

9. The sliding roof system according to claim 1, wherein the support lever has a front end connected in an articulating manner to the rear end region of the support profile and a rear end non-movably fixed to the slip joint element, the guide rail arrangement defining a channel therein which opens upwardly through a slot defined between opposed and laterally-spaced edges of a top wall of the guide rail arrangement, the top wall defining an upper extent of the channel and the guide rail arrangement having a bottom wall spaced vertically from the top wall and defining a lower extent of the channel, the slip joint element being disposed within the channel between the top and bottom walls, and the convex outer contour of the slip joint element cooperates with the top and bottom walls to permit limited pivoting movement of the slip joint within the channel.

10. The sliding roof system according to claim 1, wherein the support element is fixed to the support lever and protrudes downwardly therefrom towards the guide track arrangement, the support element selectively engaging within the support recess of the guide track arrangement to limit rearward movement of the support profile in a longitudinal direction substantially parallel with the guide track arrangement.

* * * * *